UNITED STATES PATENT OFFICE.

PHILIP S. CLARKSON, OF BEVERLY, NEW JERSEY, ASSIGNOR TO HERMAN A. METZ, OF BROOKLYN, NEW YORK.

METHOD OF MAKING HYDROSULFITE SOLUTIONS.

No. 827,420.  Specification of Letters Patent.  Patented July 31, 1906.

Application filed November 7, 1905. Serial No. 286,294.

*To all whom it may concern:*

Be it known that I, PHILIP S. CLARKSON, a citizen of the United States, residing at Beverly, in the county of Burlington and State of New Jersey, have invented certain new and useful Improvements in Methods of Making Hydrosulfite Solutions, of which the following is a specification.

This invention is a method of preparing solutions of hydrosulfites, the object of the invention being to obtain hydrosulfite solutions of greater strength and stability than are yielded by the methods in use—as, for instance, by the reduction of sulfurous acid or acid sulfites by zinc-dust in excess.

I have found that a hydrosulfite solution of great stability may be obtained by the addition to the usual reducing mixture consisting of zinc-dust or other reducing agent and water, before the addition thereto of the sulfurous acid or acid salt, of salts of tribasic acids, and more particularly such alkali-metal salts of tribasic acids as have an alkaline reaction toward litmus. The most satisfactory results are obtained with trisodium phosphate; but I may also use salts of similar character—as, for instance, borax or sodium tungstate or the corresponding potassium salts. To the mixture so prepared the sulfurous acid may be supplied as gaseous sulfur dioxid, as a solution, or in the form of an acid salt, the term "sulfurous acid" being herein employed to include the reagent in these several forms. The reaction proceeds in a satisfactory manner in respect to yield, and the solutions obtained are relatively stable. Thus a solution prepared from zinc-dust and sodium bisulfite in the usual manner will be completely decomposed upon standing at ordinary temperatures exposed to the air for a period of two days, whereas a solution prepared as herein described will not be fully decomposed by exposure under similar conditions for seven days.

My process does not contemplate the addition of compounds to the prepared hydrosulfite solution for the purpose of preserving it, but their addition to the reducing agent or paste employed for the preparation of such solutions. It is probable that the favorable effect of the salts mentioned is due to their action in preventing or counteracting any injurious effect which the presence of sulfurous acid might otherwise have upon the hydrosulfite already formed or in process of formation.

Example: Forty-five parts of zinc-dust are mixed with one hundred parts of water in which fifty parts of trisodium phosphate crystals, $Na_3PO_4.12H_2O$, have been dissolved. To this is added five hundred and twenty-five parts sodium-bisulfite solution, 32° Twaddell. The mixture is agitated frequently and the reaction is complete in about one hour. A slight rise of temperature during the progress of the reaction may be disregarded. When the reaction is complete, the mixture is allowed to stand and the clear hydrosulfite solution is ready for use. The solution may be transformed by the usual methods into such salts of hydrosulfurous acid as may be desired, or it may be used at once for reducing indigo.

I claim—

1. The method of preparing hydrosulfite solutions which consists in reacting upon sulfurous acid with a reducing agent in presence of a salt of a tribasic acid, substantially as described.

2. The method of preparing hydrosulfite solutions which consists in reacting upon sulfurous acid with a reducing agent in presence of an alkali-metal salt of a tribasic acid having an alkaline reaction to litmus, substantially as described.

3. The method of preparing hydrosulfite solutions which consists in reacting upon sulfurous acid with zinc in presence of an alkali-metal salt of a tribasic acid having an alkaline reaction to litmus, substantially as described.

4. The method of preparing hydrosulfite solutions which consists in reacting upon sulfurous acid with zinc in presence of trisodium phosphate, substantially as described.

In testimony whereof I affix my signature in presence of two witnesses.

PHILIP S. CLARKSON.

Witnesses:
A. L. HACK,
PAUL LOESER.